Figure 1:
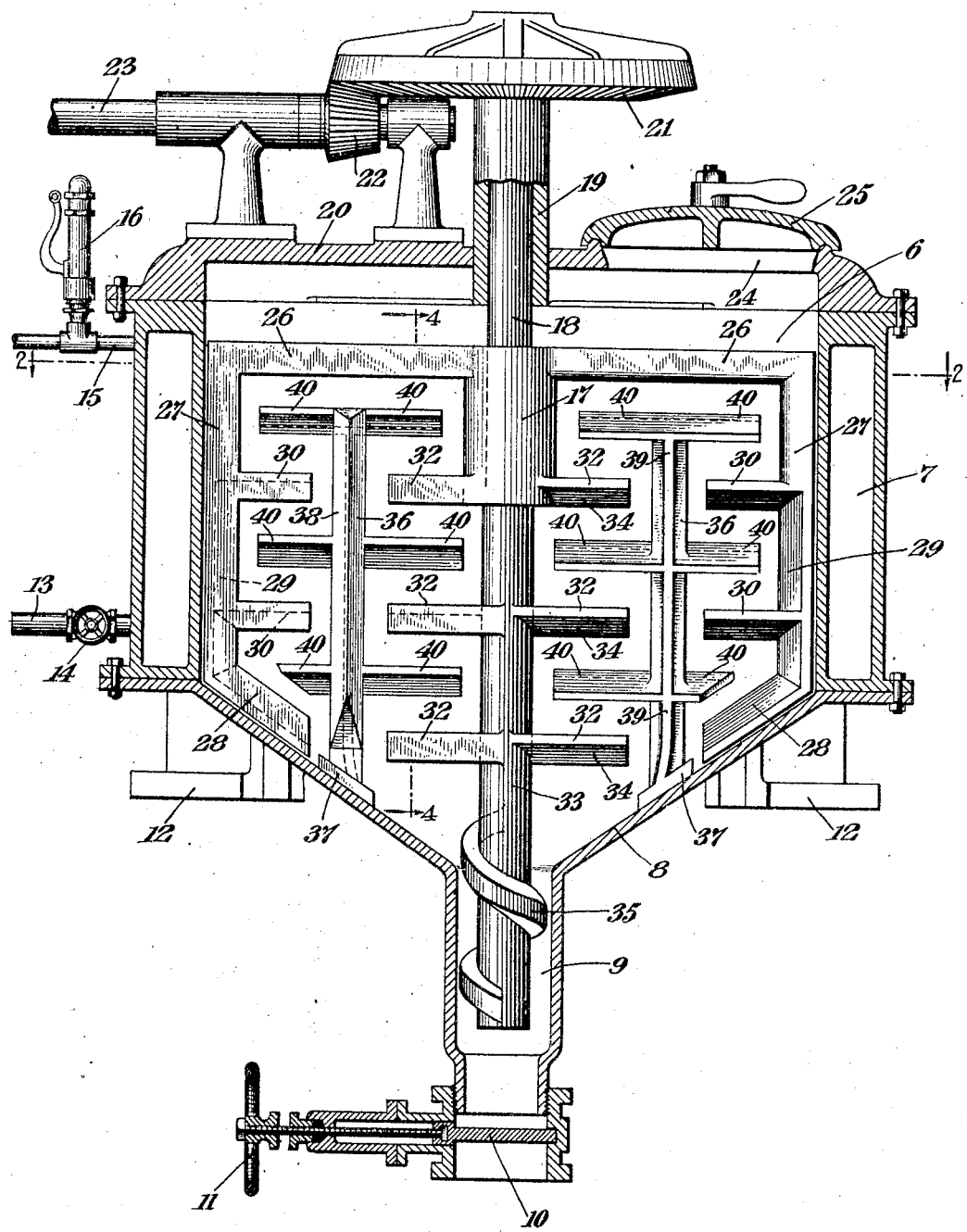

May 18, 1926.

J. G. B. PERKINS ET AL

MIXING KETTLE

Filed Oct. 26, 1923

1,585,169

2 Sheets-Sheet 1

INVENTORS
James G. B. Perkins
Edward F. Gould
BY
Ward, Crosby + Smith
ATTORNEYS

May 18, 1926.
J. G. B. PERKINS ET AL
1,585,169
MIXING KETTLE
Filed Oct. 26, 1923
2 Sheets-Sheet 2
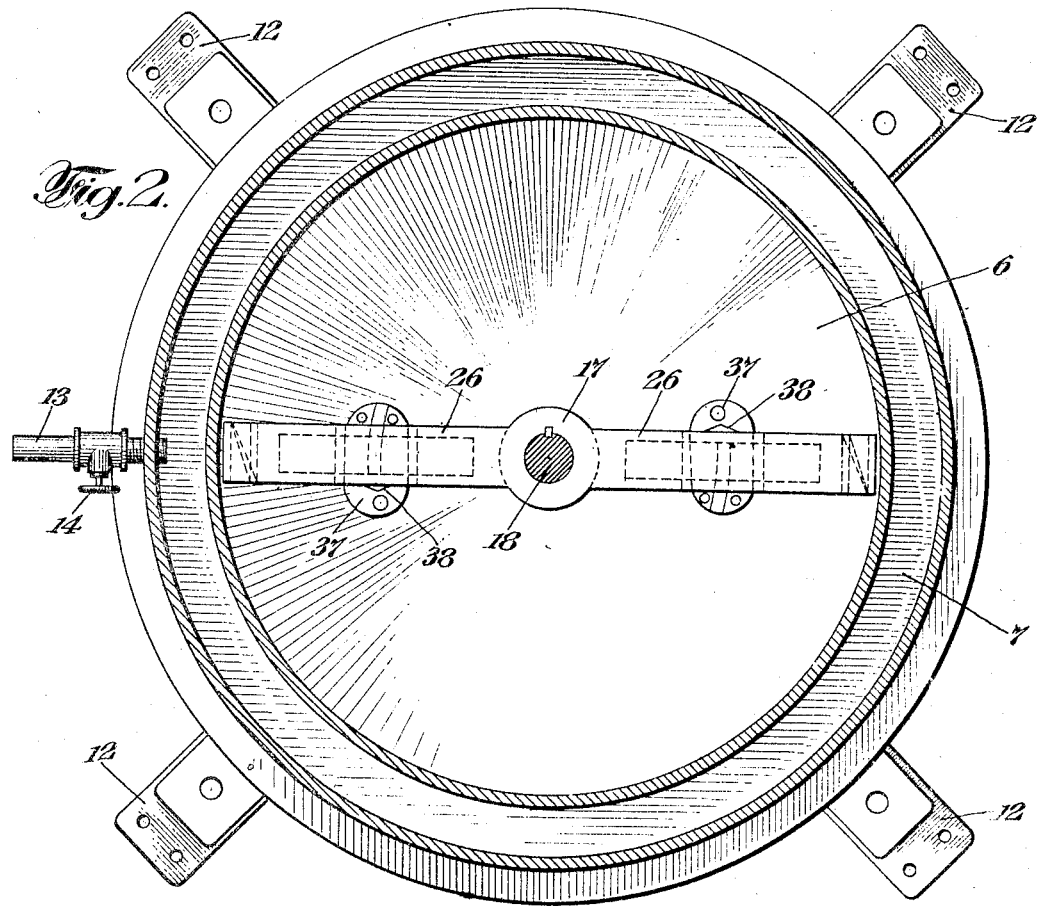
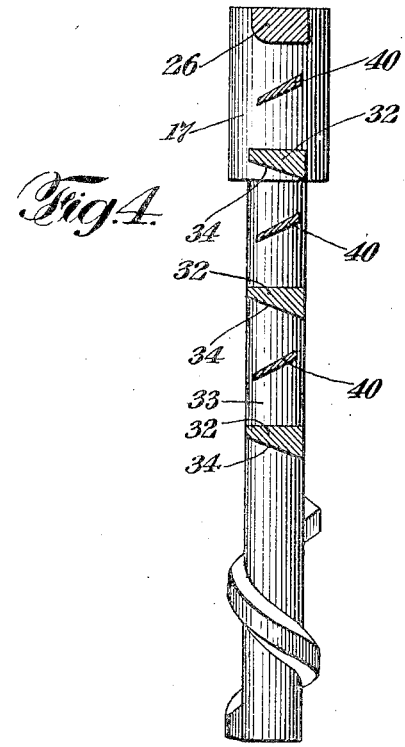
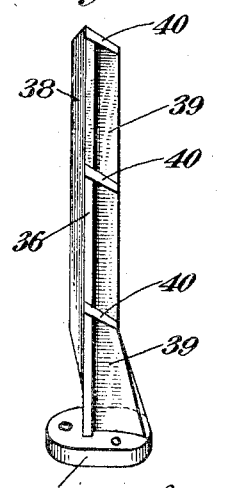
INVENTORS
James G. B. Perkins
Edward F. Gould
BY
Ward, Crosby + Smith
ATTORNEYS Patented May 18, 1926.

1,585,169

UNITED STATES PATENT OFFICE.

JAMES G. B. PERKINS AND EDWARD F. GOULD, OF LANSDALE, PENNSYLVANIA, ASSIGNORS, BY MESNE ASSIGNMENTS, TO PERKINS GLUE COMPANY, A CORPORATION OF DELAWARE.

MIXING KETTLE.

Application filed October 26, 1923. Serial No. 671,036.

Our invention relates to improvements in mixing kettles and more particularly to kettles adapted for the mixing of glue or other viscous or heavy materials. The object of our invention is to provide an improved mixing kettle which will accomplish the desired mixing in a very thorough manner and which kettle is generally more efficient in construction and operation. Further and more specific objects, features and advantages will more clearly appear from the detail description given below taken in connection with the accompanying drawings which form a part thereof.

In the drawings Fig. 1 is a vertical section through a mixing kettle embodying our improvements in a preferred form thereof. Fig. 2 is a transverse section taken on the line 2—2 of Fig. 1. Fig. 3 is a detail of one of the fixed upright arm carrying members shown in Fig. 1 and Fig. 4 is a section taken on the line 4—4 of Fig. 1.

Referring to the drawings, 6 represents a suitable cylindrical container which may be made of cast iron and which is provided with a heating and cooling jacket 7 and a downwardly extending conical bottom portion 8 having centrally disposed therein an outlet 9 at the lower end of which is provided a gate valve 10 connected with a hand wheel 11 for operating the same whereby the outlet may be opened or closed as desired. The bottom portion 8 is also provided with integral lugs 12 for supporting the kettle on the floor or platform with suitable bolts. Steam or other heating fluid or cooling fluid such as water may be introduced into the jacket 7 through a pipe 13 by opening valve 14, the excess fluid may escape through a pipe 15. 16 represents a safety valve to prevent excess pressure being exerted in the jacket.

Arranged to rotate about a central vertical axis in the container is a stirrer 17. This stirrer member is rigidly secured to a shaft 18 journaled in a bearing 19 in the cover member 20 of the kettle. Shaft 18 has secured thereto a beveled gear 21 which is adapted to be driven by a bevel gear 22 secured to a driving shaft 23. The cover 20 is provided with a suitable opening 24 adapted to be closed by removable cover 25.

The stirrer 17 is provided with two horizontal arms 26 extending substantially to the inside wall of the cylindrical container. Connected to the end of the arms 26 are upright arms 27 which are adapted to travel about the container adjacent the side wall thereof. At the bottom of the upright members 27 there are connected thereto arm members 28 adapted to travel adjacent the conical bottom surface of the container. The upright arms 27 and the arm members 28 are beveled off or inclined on their front edges as indicated at 29 and as the stirring member is revolved, these arms 27 and 28 tend to force the material stirred in the container, away from the side and bottom walls of the container. The arms 27 carry horizontal arms 30. These arms have beveled faces on their underneath sides inclined to the horizontal in a direction to tend to force the material downwardly as the rotating stirrer passes through material being stirred. The stirrer 17 is provided with a centrally disposed shaft portion 33 from which extend integral horizontal arms 32. These arms 32 also have beveled faces 34 on their underneath sides which are inclined to the horizontal in a direction to tend to force the material downwardly as the stirrer is rotated and passes through the material being stirred. The bevel on the arms 30 is the same as the bevel on the arms 32. The shaft 33 also has on its bottom portion a worm or screw 35 operating in the outlet 9 and which when the valve 10 is closed tends to stir or agitate any material in the outlet and when the valve 11 is open acts to force the material downwardly through the outlet.

Extending upwardly between the arms 30 and 32 are upright members 36. These upright members 36 have integral bases 37 which are suitably secured to the conical bottom 8 as by bolts or in any other suitable manner. The uprights 36 are provided with front edge portions 38 and with rearwardly extending ribs or flanges 39 to reinforce the same. The upright members 36 carry horizontal arms 40 extending horizontally from both sides of the members 36. These arms 40 are, therefore, rigidly fixed with respect to the container or kettle and they have both their top and bottom faces inclined with respect to the horizontal, the faces being beveled off or inclined in a direction opposite to the inclined faces 34. The arms 40 lie intermediate the arms 30, 32, 28 and 26 on the stirrer so that as the stirrer 17 is rotated causing the arms 30 and 32 to pass through the material being stirred, the arms 40 serve as arms which, relatively speaking, pass through the material in the opposite direction so that the apparatus is one in which the stirring members tear through the material being stirred and cause a most thorough and intimate mixing thereof. By this arrangement heavy materials, which could not be satisfactorily stirred if the relatively fixed arms 40 were not present by reason of the fact that the material would ride around with the rotating stirrer parts, may be most effectively stirred since the fixed arms 40 with the uprights 36 prevent the material from riding around with the rotating stirrer parts and so cause the stirring arms 30, 32 and 40 to pass or tear through the material in opposite directions. By connecting one set of the arms i. e. the arms 40 and the uprights 38, in fixed relation with the container or kettle, we are able to obtain this double action without the necessity of providing complicated driving means which have in the past been provided to drive two stirring members in opposite directions, both being rotated with respect to the kettle. Our improvements, therefore, obtain the advantages of two stirring members each rotating in the kettle, but at the same time our arrangement is more simple and efficient, requiring only a single rotating stirrer. The arms 28 cooperate with the conical bottom 8 so as to force the material toward the outlet 9 when the kettle is being emptied, the screw or worm 35 serving to feed the material through the outlet. The screw or worm 35 being on the rotating stirrer shaft operates to keep the material mixed in the outlet during the mixing operation and serves to automatically feed the heavy material through the outlet when the valve 10 is open. This feeding out action is accomplished by the same driving connections which drive the stirrer and the stirrer is operated at the same time to keep the material being mixed as it is being emptied from the kettle.

While we have described our improvements in great detail and with respect to a preferred form thereof, we do not desire to be limited to such form or details since many changes and modifications may be made without departing from the spirit and scope of the invention in its broader aspects. We, therefore, desire to cover all forms and changes coming within the scope of any one or more of the appended claims.

What we claim as new and desire to secure by Letters Patent, is:

1. A mixing kettle for viscous or heavy materials comprising a container, a rotatable stirrer member having arm portions traveling adjacent and over the major portion of the container side walls and over a portion of the bottom for scraping material therefrom, stirrer means fixed in respect to the container walls in a position permitting free rotation of said rotatable stirrer member and to cooperate therewith to mix the material, and a cover for the container comprising an end wall thereof which is removable independently of said fixed and rotatable stirrer means.

2. A mixing kettle for viscous materials comprising a container, a stirrer rotatable therein, said stirrer having arms extending outwardly from the axis of the stirrer and substantially at right angles thereto, said stirrer also having outer members with arms extending inwardly therefrom substantially at right angles to the axis of the stirrer, means fixed with respect to the container and extending between the ends of said outwardly extending arms and the ends of said inwardly extending arms, arms on said means extending intermediate said outwardly extending arms and arms on said means extending intermediate said inwardly extending arms.

3. A mixing kettle for viscous materials comprising a container, a stirrer rotatable therein about a vertical axis, said stirrer having horizontal arms adapted to pass through the material in the container to stir the material, and horizontal arms fixedly secured with respect to the container and lying intermediate the first mentioned arms on the rotating stirrer as the latter pass the said fixed arms, said rotating stirrer arms having bottom faces inclined to the horizontal in one direction and said fixed arms having faces inclined to the horizontal in the opposite direction whereby the materials being mixed are pressed downwardly.

4. A mixing kettle for viscous materials comprising a jacketed container having downwardly extending conical bottom with an outlet in said bottom, a stirrer rotatable in the container and having means for forcing material in said container through said outlet, said stirrer having horizontal arms adapted to pass through the material in the container to stir the material in the container and horizontal arms fixedly secured with respect to the container and lying intermediate the first mentioned arms on the rotating stirrer as the latter pass the said fixed arms, said rotating stirrer arms having faces inclined to the horizontal in one direction and said fixed arms having faces inclined in the opposite direction whereby the materials being mixed are forced toward said outlet.

5. A mixing kettle for viscous or heavy materials comprising a container, a single integral rotatable stirrer member therein, having horizontal arms adapted to pass through the material in the container, having upright arms traveling adjacent the side of the container and also arm portions traveling adjacent the bottom of the container, and horizontal arms fixedly secured with respect to the container and lying intermediate the first mentioned arms on the rotating stirrer as the latter pass the said fixed arms.

6. A mixing kettle for viscous or heavy materials comprising a container, a single integral rotatable stirrer member therein, having horizontal arms adapted to pass through the material in the container, having upright arms traveling adjacent the side of the container, and horizontal arms fixedly secured with respect to the container and lying intermediate the first mentioned arms on the rotating stirrer as the latter pass the said fixed arms, said fixed arms being carried on upright members secured to the bottom of the container.

7. A glue mixing kettle comprising a jacketed container having downwardly extending conical bottom with an outlet in said bottom, a stirrer rotatable in the container and having means for forcing material in said container through said outlet, said stirrer having horizontal arms adapted to pass through the material in the container, said stirrer also having upright arms traveling adjacent the side of the container, and horizontal arms fixedly secured with respect to the container and lying intermediate the first mentioned arms on the rotating stirrer as the latter pass the said fixed arms, said fixed arms being carried on upright members secured to the bottom of the container, and said stirrer also having arm portions traveling adjacent the conical bottom of the container.

8. A glue mixing kettle comprising a container, a stirrer therein rotatable about a vertical axis, said stirrer having a set of horizontal arms extending radially from the axis of the stirrer and a vertical member for scraping material from the side of the container, said vertical member having a set of horizontal arms extending inwardly, an upright member fixed to the container and extending upwardly between said two sets of horizontal arms on the stirrer as the latter pass the upright member; and said upright member having horizontal arms.

9. A mixing kettle for viscous materials comprising a container, a stirrer therein rotatable about a vertical axis, said stirrer having a set of horizontal arms extending radially from the axis of the stirrer and a vertical member for scraping material from the side of the container, said vertical member having a set of horizontal arms extending inwardly, an upright member fixed to the container, and extending upwardly between said two sets of horizontal arms on the stirrer as the latter pass the upright member, and said upright member having horizontal arms extending between the arms of said first set of horizontal arms on the stirrer and also horizontal arms extending between the arms of said second set of horizontal arms on the stirrer.

10. A mixing kettle comprising a container, a stirrer therein rotatable about a vertical axis, said stirrer having a set of horizontal arms extending radially from the axis of the stirrer and a plurality of vertical members for scraping material from the side of the container, said vertical members each having a set of horizontal arms extending inwardly, a plurality of upright members fixed to the container bottom and extending upwardly between first set of horizontal arms on the stirrer and the other horizontal arms on the stirrer as the latter pass the upright member, and said upright member having horizontal arms, extending between the arms of the first set on the stirrer and also horizontal arms extending between the other arms on the stirrer, said container having a conical bottom with an outlet therein, and said stirrer having members travelling adjacent said conical bottom.

11. A mixing kettle comprising a container, a stirrer therein rotatable about a vertical axis, said stirrer having a set of horizontal arms extending radially from the axis of the stirrer and a plurality of vertical members for scraping material from the side of the containers, said vertical members each having a set of horizontal arms extending inwardly, a plurality of upright members fixed to the container and extending upwardly between the first set of horizontal arms on the stirrer and the other horizontal arms on the stirrer as the latter pass the upright member, and said upright member having horizontal arms, extending between the arms of the first set on the stirrer and also horizontal arms extending between the other arms on the stirrer, said container having a conical bottom with an outlet therein, and said stirrer having members travelling adjacent said conical bottom, said last mentioned members being carried by said vertical members and said upright members being secured to said conical bottom.

12. A mixing kettle for viscous materials comprising a container, a stirrer rotatable therein, said stirrer having arms extending outwardly from the axis of the stirrer and substantially at right angles thereto, said stirrer also having outer members with arms extending inwardly therefrom substantially at right angles to the axis of the stirrer, means fixed with respect to the container and extending between the ends of said outwardly extending arms and the ends of said inwardly extending arms, arms on said means extending intermediate said outwardly extending arms and arms on said means extending intermediate said inwardly extending arms, said fixed means being carried on upright members secured to the bottom of the container.

13. A mixing kettle for glue and the like material comprising a container having a substantially cylindrical jacketed body portion, a substantially conical bottom member detachably secured to said body portion, fixed and rotatable stirrer members within the container cooperating with each other and with the interior walls of the body and bottom members to thoroughly mix the material, and a cover for the container comprising an end wall thereof detachably secured to said body portion.

In testimony whereof we have signed our names to this specification.

JAMES G. B. PERKINS.
EDWARD F. GOULD.